Figure 1:
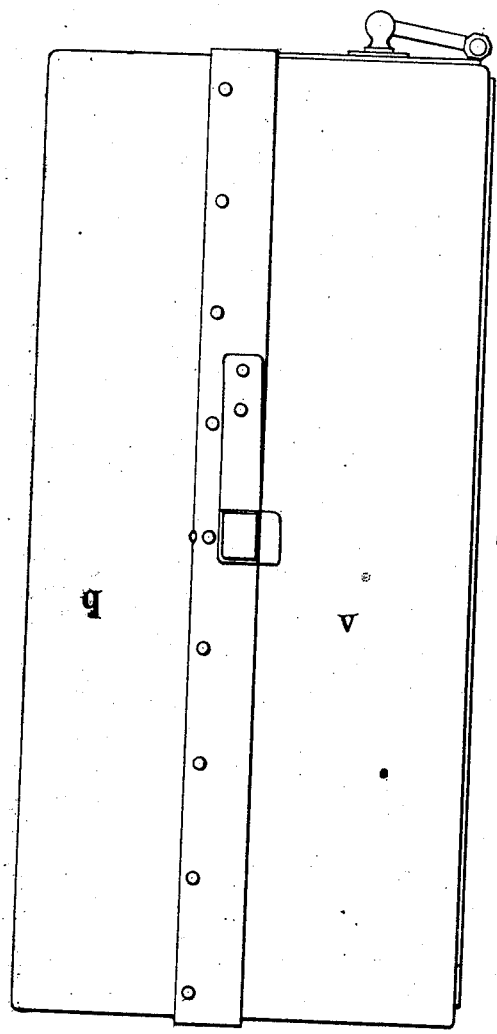

L. H. HUET.
APPARATUS FOR TAKING OR REPRODUCING ANIMATED PICTURES.
APPLICATION FILED JULY 3, 1909.

1,092,053.
Patented Mar. 31, 1914.
13 SHEETS—SHEET 1.

WITNESSES
J. P. Davis
G. H. Emslie

INVENTOR
Louis Henri Huet
BY
Munn & Co
ATTORNEYS

L. H. HUET.
APPARATUS FOR TAKING OR REPRODUCING ANIMATED PICTURES.
APPLICATION FILED JULY 3, 1909.

1,092,053.

Patented Mar. 31, 1914.

13 SHEETS—SHEET 2.

WITNESSES
J. P. Davis
G. H. Emslie

INVENTOR
Louis Henri Huet
BY
Munn Co
ATTORNEYS

L. H. HUET.
APPARATUS FOR TAKING OR REPRODUCING ANIMATED PICTURES.
APPLICATION FILED JULY 3, 1909.

1,092,053.

Patented Mar. 31, 1914.
13 SHEETS—SHEET 3.

WITNESSES
J. P. Davis
G. H. Emslie

INVENTOR
Louis Henri Huet
BY
Munn & Co
ATTORNEYS

L. H. HUET.
APPARATUS FOR TAKING OR REPRODUCING ANIMATED PICTURES.
APPLICATION FILED JULY 3, 1909.

1,092,053.

Patented Mar. 31, 1914.
13 SHEETS—SHEET 5.

WITNESSES
J. P. Davis
G. H. Emslie

INVENTOR
Louis Henri Huet
BY
Munn & Co.
ATTORNEYS

L. H. HUET.
APPARATUS FOR TAKING OR REPRODUCING ANIMATED PICTURES.
APPLICATION FILED JULY 3, 1909.
1,092,053.
Patented Mar. 31, 1914.
13 SHEETS—SHEET 6.
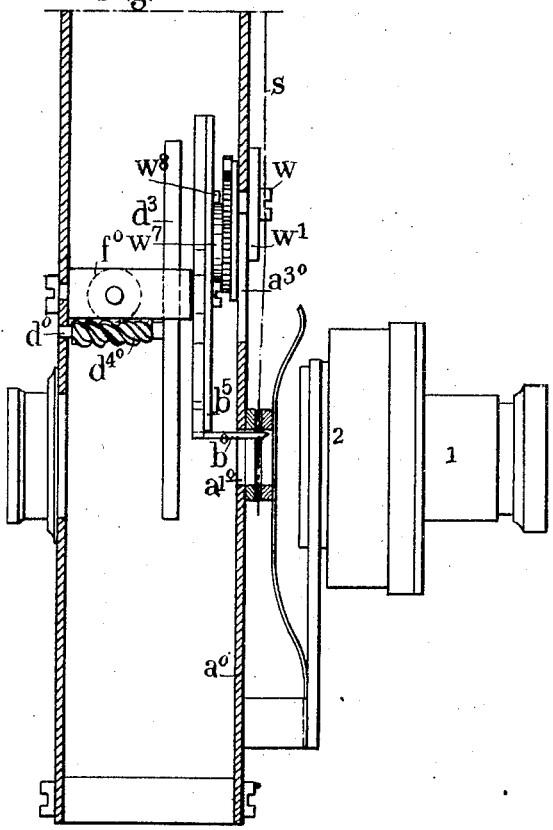
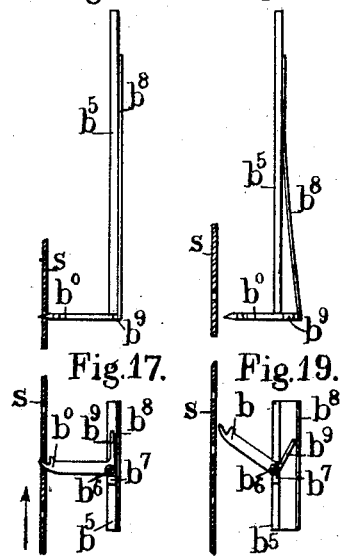
INVENTOR
Louis Henri Huet
BY
Munn Co.
ATTORNEYS

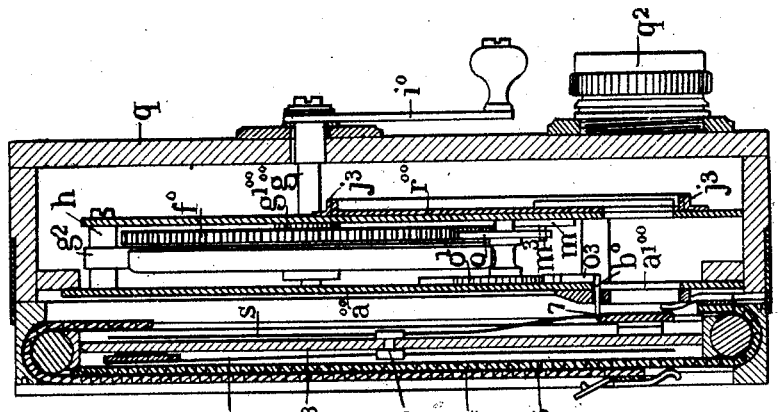
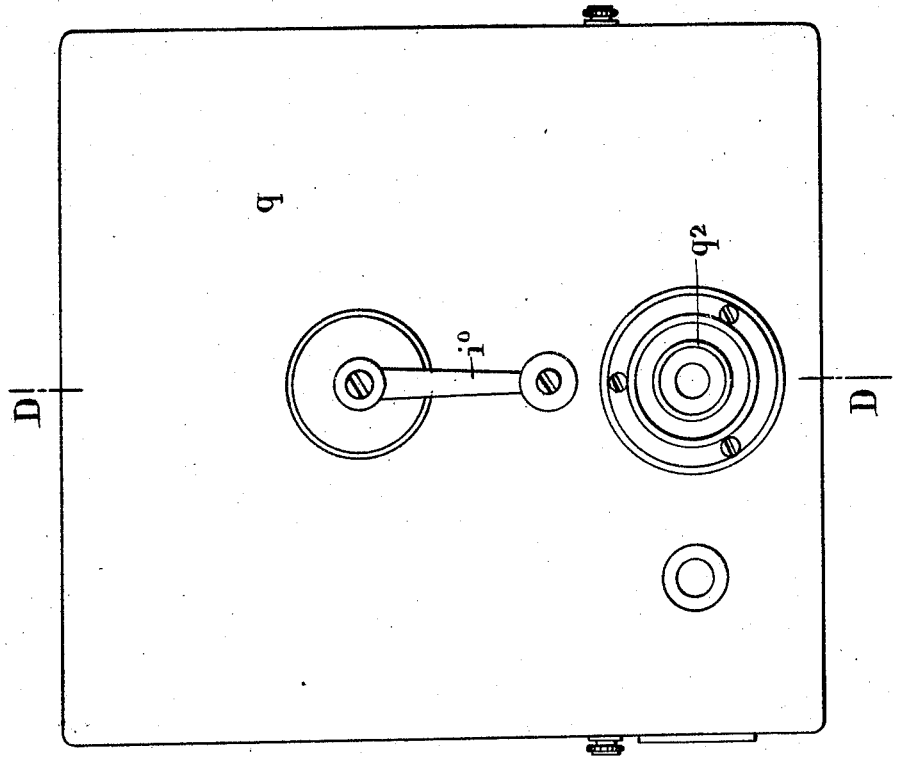

L. H. HUET.
APPARATUS FOR TAKING OR REPRODUCING ANIMATED PICTURES.
APPLICATION FILED JULY 3, 1909.

1,092,053.

Patented Mar. 31, 1914.

13 SHEETS—SHEET 9.

WITNESSES
J. P. Davis
G. H. Emslie

INVENTOR
Louis Henri Huet
BY
Munn & Co
ATTORNEYS

L. H. HUET.
APPARATUS FOR TAKING OR REPRODUCING ANIMATED PICTURES.
APPLICATION FILED JULY 3, 1909.
1,092,053.
Patented Mar. 31, 1914.
13 SHEETS—SHEET 10.
Fig. 24.
Fig. 25.
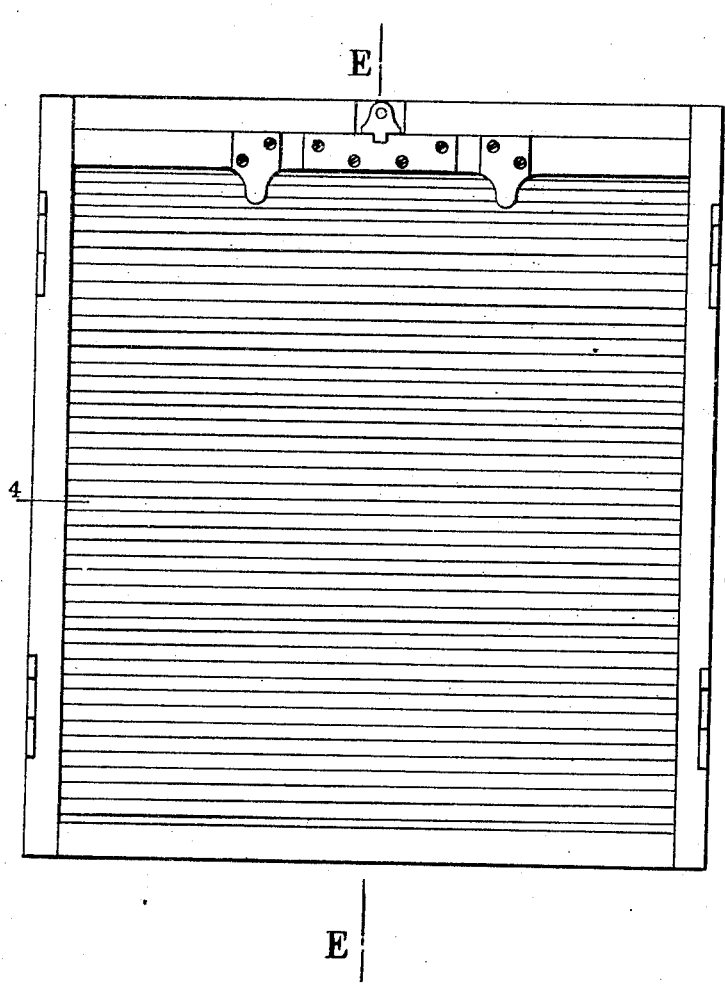
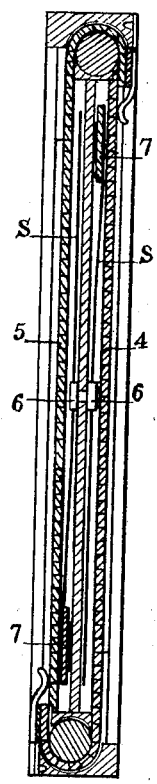
WITNESSES
J. P. Davis
G. H. Emelie
INVENTOR
Louis Henri Huet
BY
Munn & Co
ATTORNEYS L. H. HUET.
APPARATUS FOR TAKING OR REPRODUCING ANIMATED PICTURES.
APPLICATION FILED JULY 3, 1909.

1,092,053.

Patented Mar. 31, 1914
13 SHEETS—SHEET 11.

WITNESSES
J. P. Davis
G. H. Emslie

INVENTOR
Louis Henri Huet
BY
Munn & Co
ATTORNEYS

L. H. HUET.
APPARATUS FOR TAKING OR REPRODUCING ANIMATED PICTURES.
APPLICATION FILED JULY 3, 1909.

1,092,053.

Patented Mar. 31, 1914.
13 SHEETS—SHEET 12.

WITNESSES
J. P. Davis
G. H. Emale

INVENTOR
Louis Henri Huet
BY
Munn & Co
ATTORNEYS

L. H. HUET.
APPARATUS FOR TAKING OR REPRODUCING ANIMATED PICTURES.
APPLICATION FILED JULY 3, 1909.

1,092,053.

Patented Mar. 31, 1914.

13 SHEETS—SHEET 13.

WITNESSES
J. P. Davis
G. H. Emslie

INVENTOR
Louis Henri Huet
BY
Munn & Co
ATTORNEYS

UNITED STATES PATENT OFFICE.

LOUIS HENRI HUET, OF PARIS, FRANCE, ASSIGNOR TO SOCIÉTÉ HUET & CIE., OF PARIS, FRANCE.

APPARATUS FOR TAKING OR REPRODUCING ANIMATED PICTURES.

1,092,053. Specification of Letters Patent. Patented Mar. 31, 1914.

Application filed July 3, 1909. Serial No. 505,886.

*To all whom it may concern:*

Be it known that I, LOUIS HENRI HUET, of 114 Rue du Temple, in the city of Paris, Republic of France, have invented Improvements in and Relating to Apparatus for Taking or Reproducing Animated Pictures, of which the following is a full, clear, and exact description.

Up to now the photography of animated pictures has been possible practically on films only. These films, which have a very great length, are cumbersome and costly; the development and taking of the positive pellicular bands or films present certain difficulties, moreover they necessitate a special installation or plant and special apparatus. For these several reasons, the photography of animated pictures can be executed actually by professionals only. In order to remedy this disadvantage, it has been proposed to arrange the images on a plate or disk either circumferentially or in a spiral, but the arrangement of the apparatus contrived up to this day has necessitated that the sensitized disk or plate be fastened positively on the operating mechanism; it was therefore necessary to resort to a laboratory after each operation in order to remove the impressed plate and to replace the same by a new one; moreover these apparatus do not permit the positive registering of the views by reason of the vibrations of the bodies in motion.

The present invention has for its object a special operating device obviating all the disadvantages of the preceding apparatus. By reason of its special combination, this device puts kinematography within reach of the public and enables photograph amateurs to take successively several animated scenes without being compelled to go in a dark room for substituting a plate for another one in the photographic apparatus.

This device is essentially characterized by the combination:

1. Of a disk or plate provided with a succession of perforations having between them the same angular distances as the images arranged side by side and disposed in such a manner as to describe the (spiral or circumferential) curve along which these images must be arranged on the disk plate.

2. Of a special operating mechanism comprising one or more studs receiving a twofold movement: a movement of advance and retreat for the purpose of engaging with the perforations of the kinematographic disk and of disengaging from same and a movement of translation for the purpose of transmitting to this device the displacement corresponding with the angular distance between one image and the next. Said operating mechanism, therefore, constitutes means to cause such movement of the disk as may be required to properly position the images in succession along the curve above referred to.

3. For the appartus for taking pictures, a photographic sheath presenting a central projection completely independent of the operating mechanism and on which is mounted and can turn freely the photographic disk, the latter being provided for this purpose with a central hole the diameter of which is equal to that of this projection. When the images are to be arranged in a spiral, this projection is movable in a slide presented by the sheath and normal or sensibly normal to the trajectory of the operating stud.

In the present system of transmitting motion there is no more need for the photographic disk to be fixed on a carrying organ and said disk may be placed in a sheath similar to that of ordinary photographic apparatus. This system of transmitting motion enables therefore photographic apparatus to be devised for taking animated pictures with the aid of a magazine fitted with a number of sheaths and a changing device or with the aid of a sheath with a double blind, etc.

The present invention enables also to be devised an apparatus for the impression and the projection of animated pictures of a very great simplicity of construction.

Referring to the drawings accompanying my specification in which—

Figure 2:
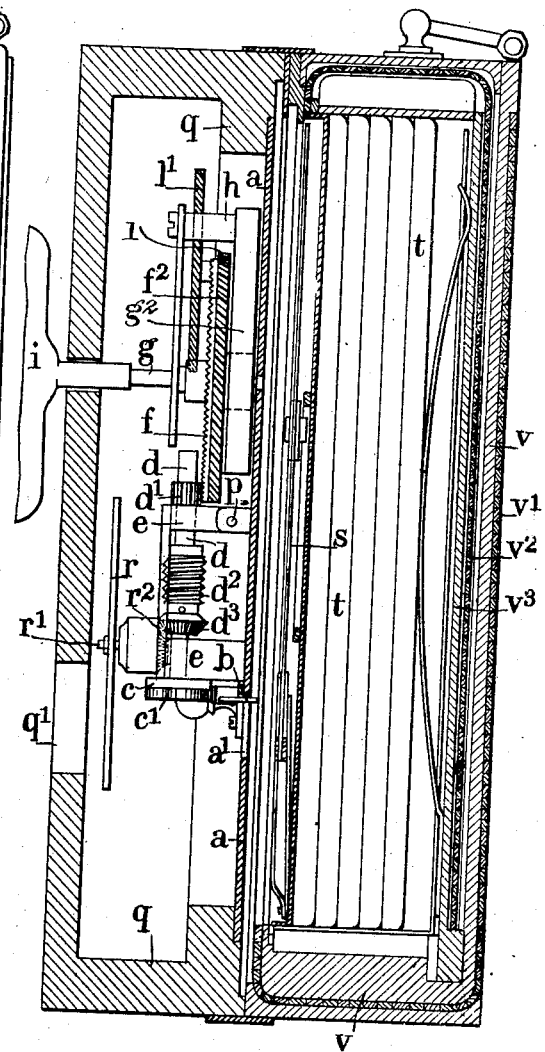
Figure 3:
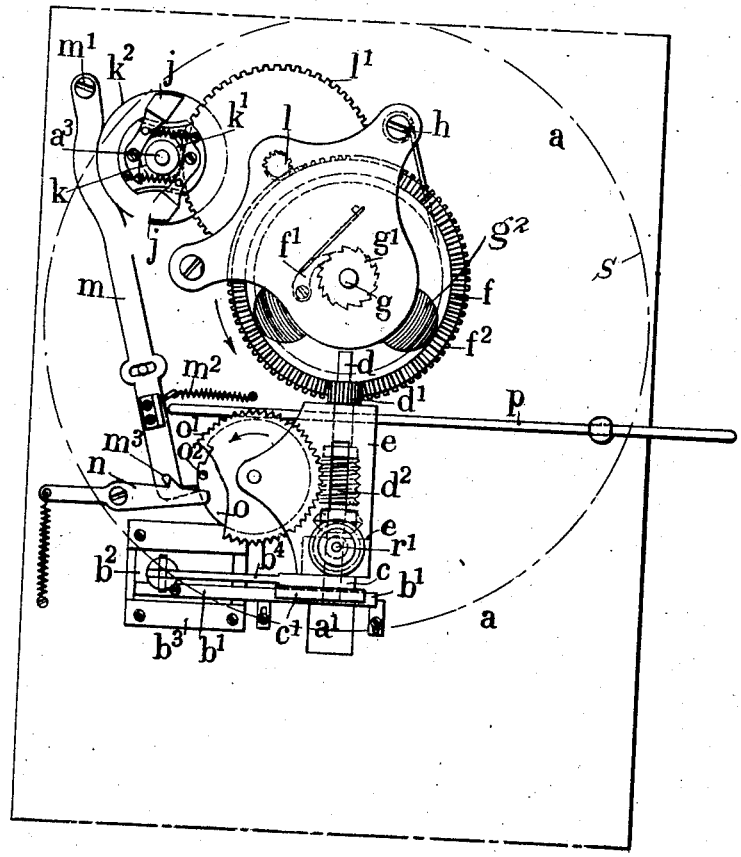
Figure 4:
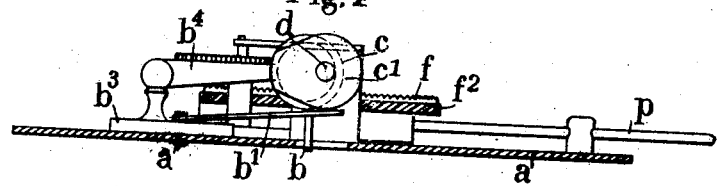
Figure 5:
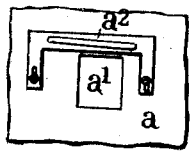
Figure 6:
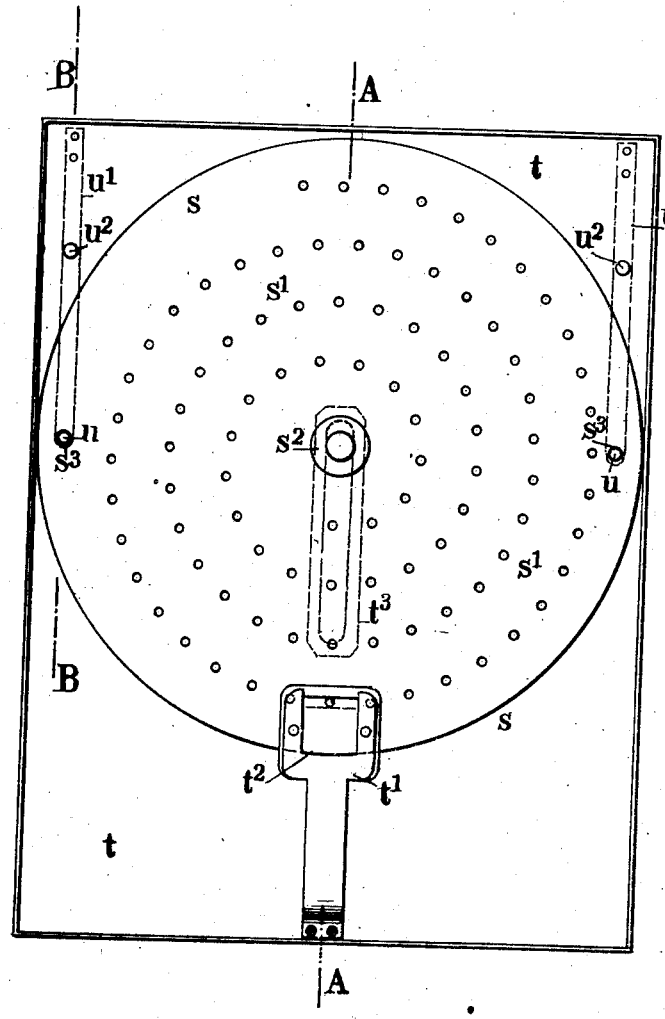
Figures 7, 8:
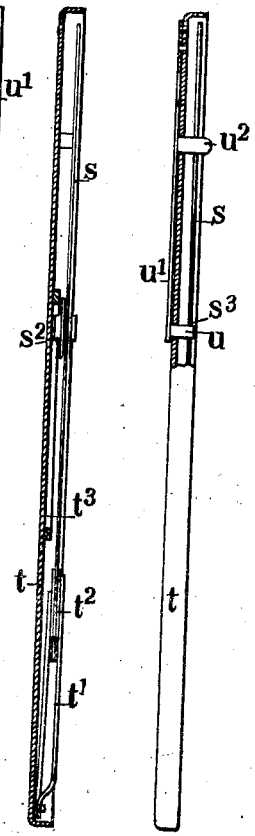
Figure 9:
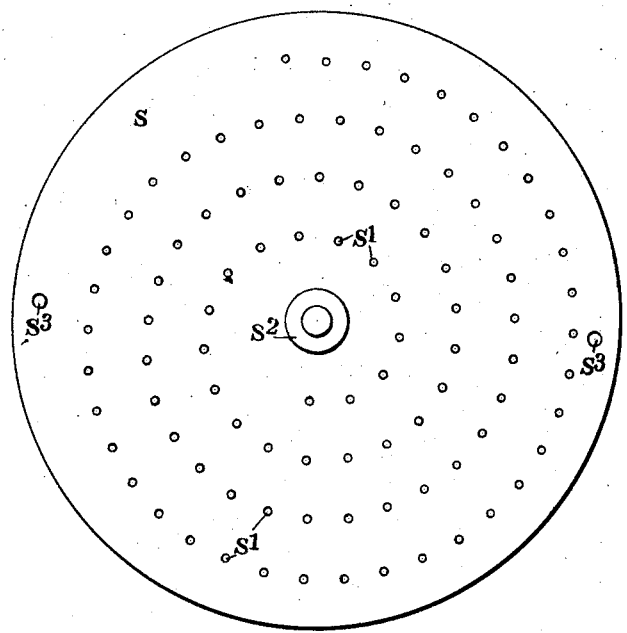
Figure 10:
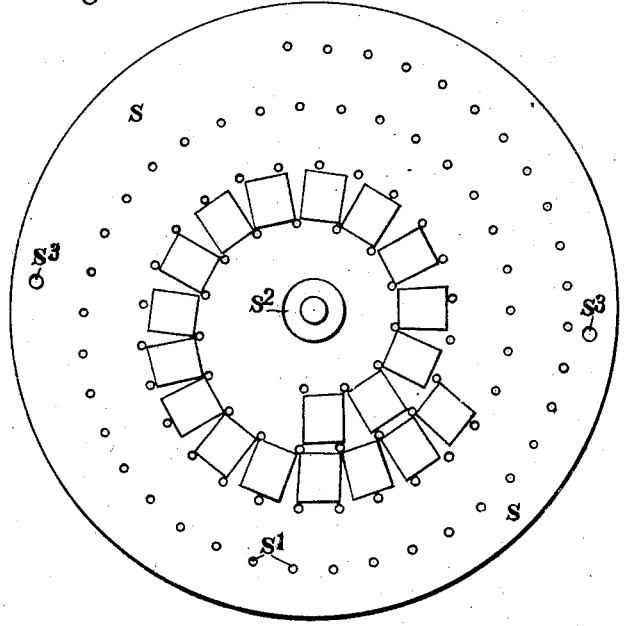
Figure 11:
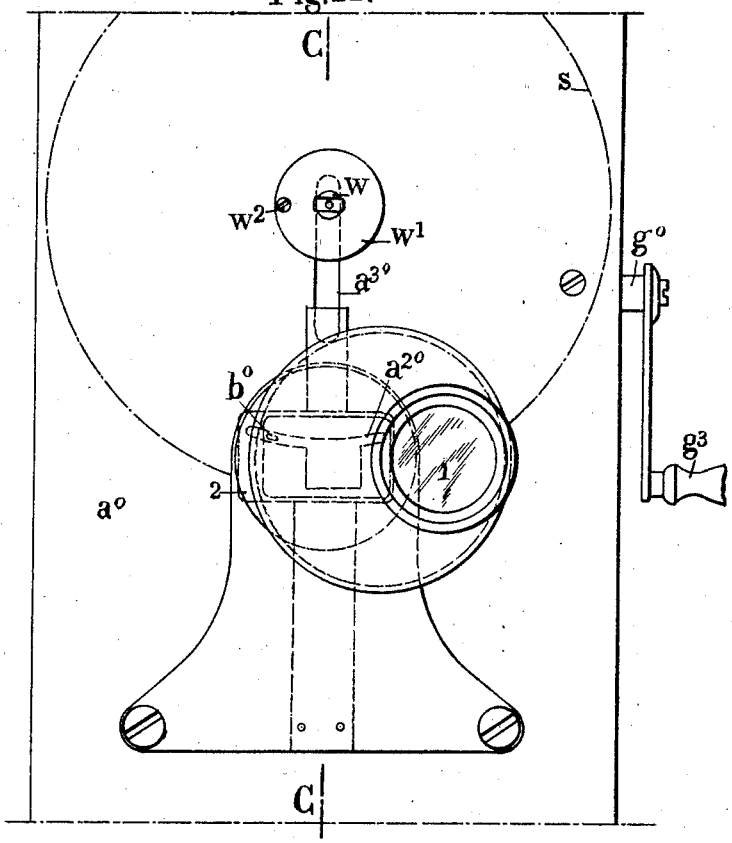
Figure 13:
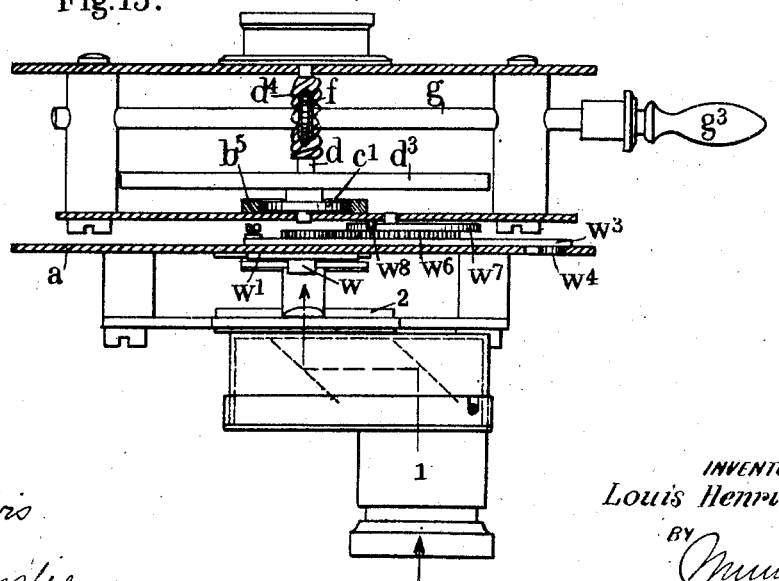
Figure 14:
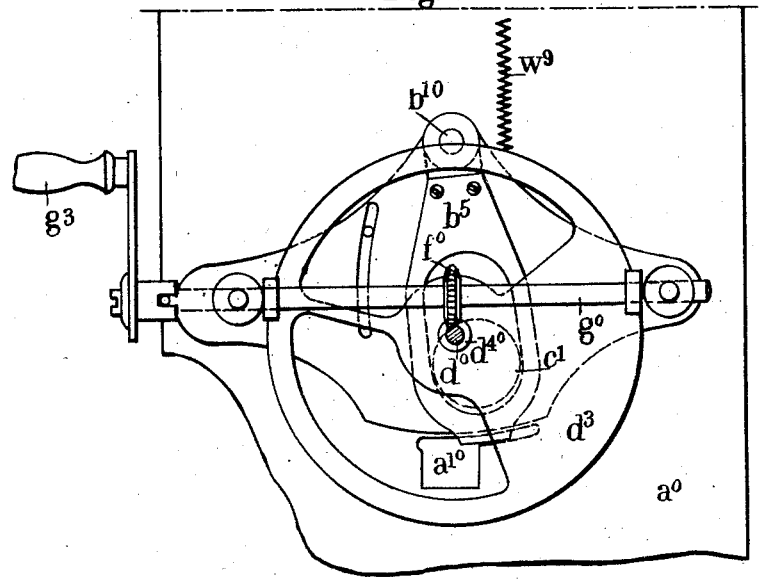
Figure 15:
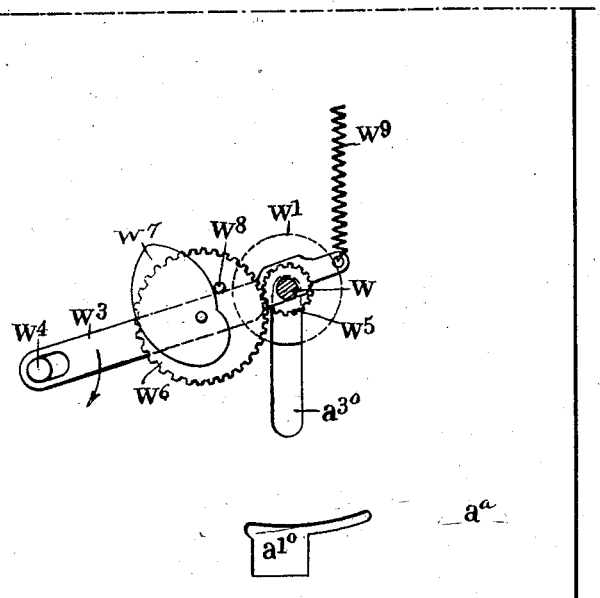
Figure 22:
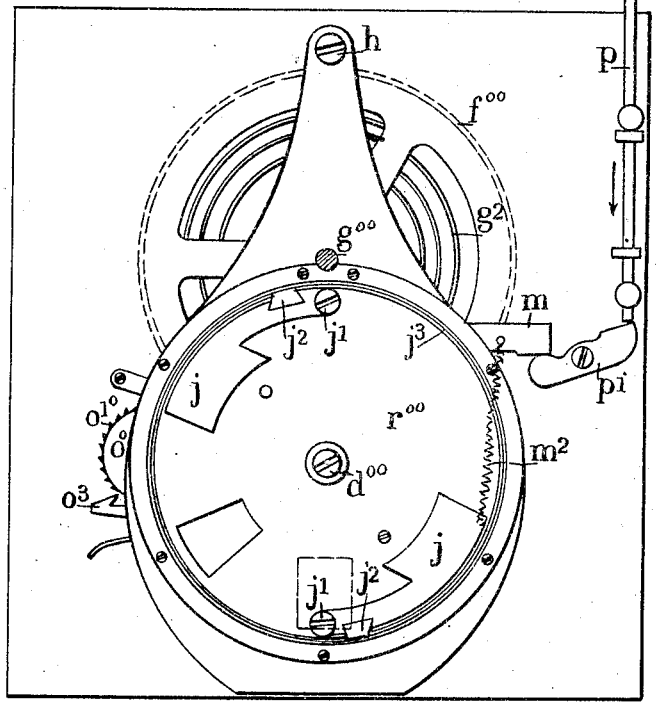
Figure 23:
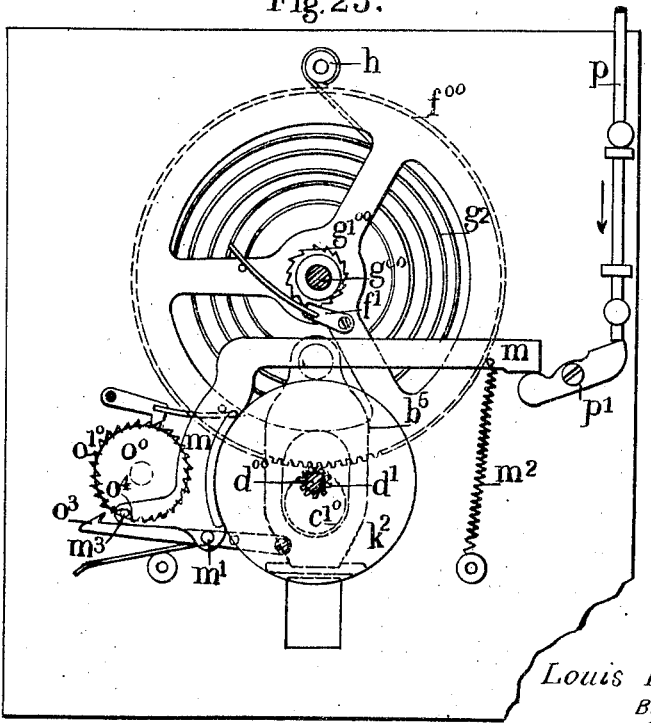
Figure 26:
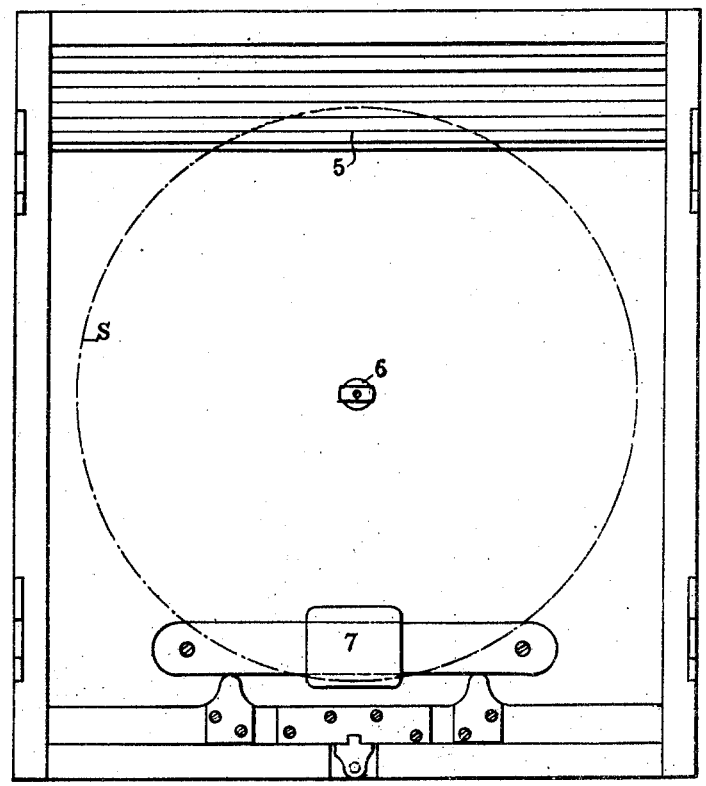
Figure 27:
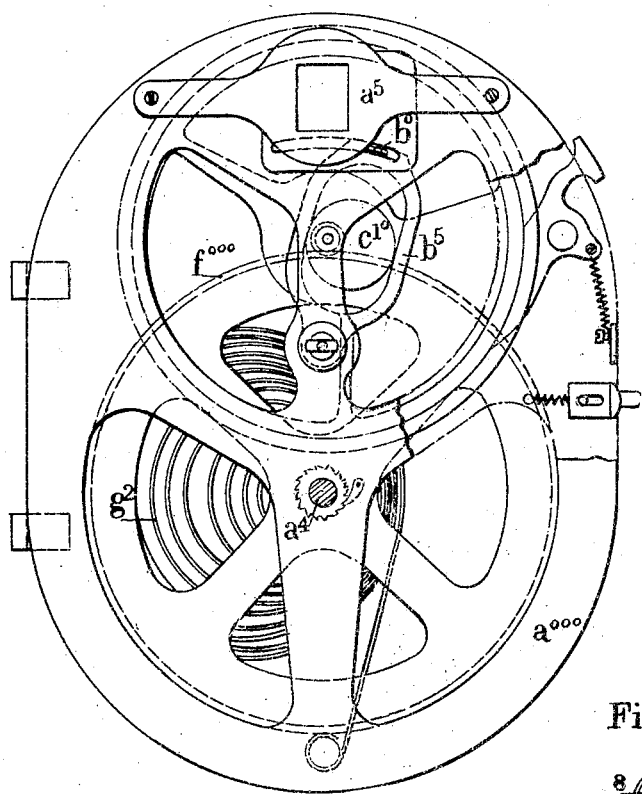
Figure 28:
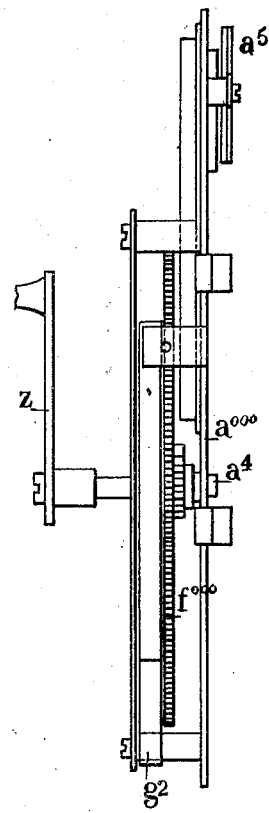
Figure 29:
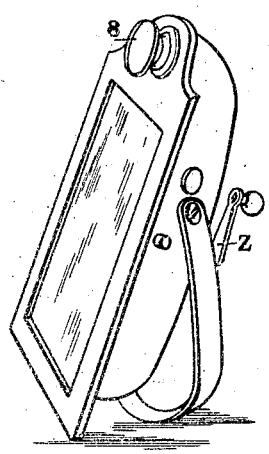
Figure 30:
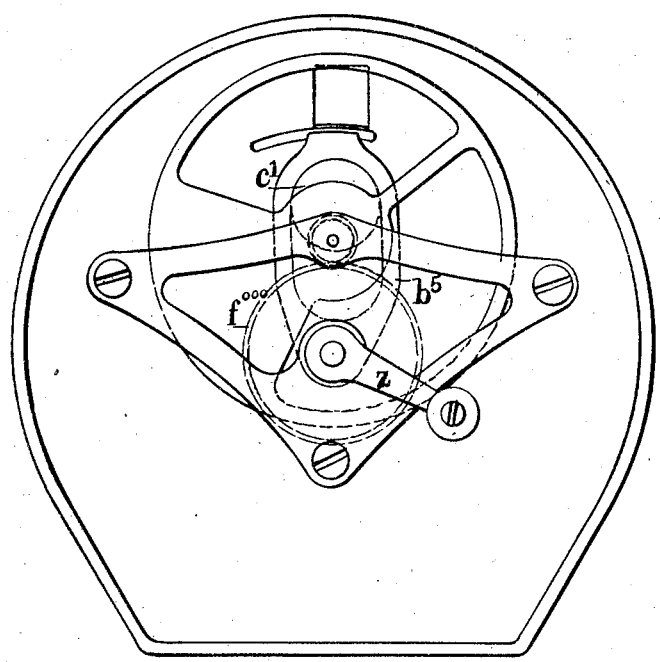
Figure 31:
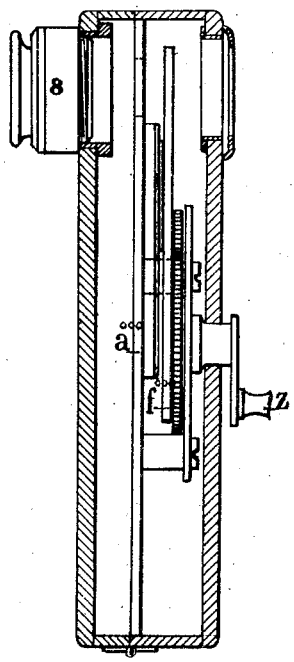

Figures 1 to 10 show an apparatus for taking animated pictures. Fig. 1 is a lateral elevation of the apparatus. Fig. 2 is a transverse vertical section. Fig. 3 shows an elevation of the operating mechanism. Fig. 4 is a lateral view showing the method of actuating the transmitting stud. Fig. 5 is a detail view, showing the manner in which the stud is guided. Fig. 6 is a front view of one of the sheaths. Figs. 7 and 8 are two sectional views, along the lines A—A and B—B respectively, of Fig. 6. Fig. 9 represents a disk previous to the impression of the images. Fig. 10 represents a disk after the impression of the images. Figs. 11 to 15 represent an apparatus for the reproduction of animated pictures. Fig. 11 is a front view. Fig. 12 is a vertical section made according to line C—C of Fig. 11. Fig. 13 is a plan view corresponding to Fig. 11. Fig. 14 represents the mechanism for operating the disk. Fig. 15 shows the releasing device. Figs. 16 to 19 are detail views of the organ operating the disk. Fig. 16 is a side view, the operating organ being engaged in the disk. Fig. 17 is a corresponding bottom view. Fig. 18 is a side view, the operating organ being disengaged from the disk. Fig. 19 is a corresponding bottom view. Figs. 20 to 23 represent a photographic apparatus allowing for taking kinematographic views arranged circumferentially. Fig. 20 is an outer front view. Fig. 21 is a cross vertical section made according to line D—D of Fig. 20. Fig. 22 is a front view of the mechanism. Fig. 23 shows the same view, the governor being removed. Figs. 24 to 26 represent a system of sheath with a double blind intended to be adapted on this photographic apparatus. Fig. 24 is a front view of the sheath, the blinds being closed. Fig. 25 is a section made according to line E—E of Fig. 24. Fig. 26 is a front view, one of the blinds being raised. Figs. 27 and 28 represent in front and in side view a clock work driven device for reproducing animated pictures. Fig. 29 is a perspective view of a photographic frame provided with this device. Figs. 30 and 31 represent in front and in section a hand driven apparatus for reproducing animated pictures.

In the picture taking apparatus represented in Figs. 1–5, all the parts of the mechanism for transmitting motion are mounted on a plate $a$. This plate is provided with an aperture $a^1$ opposite which the different parts of the disk or plate to receive the impression pass in succession, and it is also provided with an inclined slide $a^2$ serving as a guide for the operating stud $b$. This stud is carried by a flat spring $b^1$ which tends to press it toward the back of the plate $a$, this spring is mounted on a carriage $b^2$ which moves in a slide $b^3$ mounted on the plate $a$; the carriage $b^2$ receives a rectilinear reciprocating motion from an eccentric disk $c$ by means of a connecting rod $b^4$. This disk is provided with a cam $c^1$ which, by pressing on the spring $b^1$ pushes back the stud $b$ and holds it projecting beyond the plate $a$ during the time it is being moved in a straight line in one direction. This eccentric disk $c$ is keyed on to a shaft $d$ which is movable on two supports $e$ and carries, on its opposite end, a pinion $d^1$ engaging with a toothed wheel $f$ which receives a movement of rotation from the driving shaft $g$ by means of a pawl $f^1$ carried by this wheel $f$ and the ratchet wheel $g^1$ keyed on the shaft $g$. To the driving shaft $g$ is also attached one end of a spiral spring $g^2$ the other end of which is hooked on to a fixed pillar $h$. A key $i$ for winding up the train of clockwork described above engages on the end of the driving shaft $g$. The toothed wheel $f$ also operates a centrifugal governor $j$ mounted on a sleeve $k$ which runs loose on a shaft $a^3$ mounted on the plate $a$. This governor $j$ acts by friction on the fixed shaft $a^3$ when the blocks separate under the influence of centrifugal force. The sleeve $k$ receives its movement of rotation from the toothed wheel $f$, this latter being provided for that purpose with a second set of teeth $f^2$ gearing with a pinion $l$ that is on one piece with a toothed wheel $l^1$ engaging with the teeth $k^1$ of the sleeve $k$. This sleeve $k$ also carries a disk $k^2$ on which a brake lever $m$ is able to act at the moment the movement of the stud should be arrested. This lever, which turns on the shaft $m^1$ is provided with a concave part capable of engaging the contour of the disk $k^2$ under the influence of the return spring $m^2$. During the period of movement the lever $m$ is held back from engaging with the disk $k^2$ by a pawl $n$ which engages with a projection $m^3$ on the lever $m$. The release of this pawl is effected by a disk $o$ which receives a movement of rotation from the shaft $d$ through the toothed wheel $o^1$ which is in one piece with the disk $o$ and through the worm $d^2$ on the shaft $d$. The disk $o$ is fitted with a projection or stud $o^2$ which, by coming in contact with the pawl $n$ releases the brake lever $m$. The number of teeth on the wheel $o^1$ and the pitch of the worm $d^2$ are calculated in such a manner that a single turn of the disk $o$ corresponds to the total distance traversed by the photographic disk or plate in front of the aperture $a^1$. The lever $m$ may be operated by means of the push rod $p$.

The plate $a$ is mounted in a box $q$, the bottom of which box is provided with an opening $q^1$ for the reception of the lens. Inside the box and in front of the opening $q^1$ is mounted a rotary shutter $r$ keyed on a shaft $r^1$ which is operated by the shaft $d$ through the agency of bevel pinions $r^2$ $d^3$.

The photographic disk or plate $s$, as can be seen in Fig. 9, is provided with perforations $s^1$ arranged in a spiral, the intervals between them being equal to the travel of the operating stud $b$. As already mentioned, this stud moves in a slide $a^2$ which corresponds to the direction of the median tangent of the path of the perforations during the time the stud enters therein. Each disk $s$ is mounted in a sheath $t$ of special construction (Figs. 6 to 8). This sheath carries a flexibly mounted clamping member $t^1$ which presses the disk $s$ against the window $a^1$. The sheath $t$ is provided with a slide $t^3$ engaging with a gudgeon $s^2$ carried by the center of the disk $s$. The object of this slide $t^3$ is to guide the disk in its movement of translation due to the action of the stud $b$, in consequence of the reciprocating movement of stud $b$ along the inclined slide $a^2$. The holding of the disk $s$ in register in the sheath $t$ is assured by two projections $u$ each mounted on a flat spring $u^1$ fixed on the rear face of the sheath. These two projections $u$ fit into two perforations $s^3$ in the disk $s$. The flat springs $u^1$ also carry projections $u^2$ which are longer than the projections $u$ so as to compel these latter to release the disk $s$ at the moment the latter is to be moved as described later on.

The apparatus is completed by a clamping magazine $v$ for holding the sheaths $t$ carrying the disks. This magazine, which is detachable, is of the same type as that ordinarily used in photographic apparatus. The magazine is provided with two blinds; one of them $v^1$ intended for protecting the disks or plates from the light when the magazine is detached from the camera, while the other $v^2$ serves to protect the disks or plates contained in the slide $v^3$ of the magazine when this slide is pulled out for changing a sheath. The top sheath of the series is pushed up against the plate $a$ by means of springs inside the magazine. The projections $u^2$ of the springs $u^1$ thereupon come in contact with the front frame of the magazine and consequently push back the flat springs $u^1$ and release the projections $u$ from the disk $s$ which is thereby liberated. Instead of a magazine, a sheath with a double blind as described later on, can also be used.

The *modus operandi* of the apparatus is as follows: The magazine $v$ being placed in position on the camera, the blind $v^1$ is withdrawn as shown in Fig. 2, and the train of clockwork wound up; pressure is applied to the push-rod $p$ in order to release the brake lever $m$ from the disk $k^2$, this lever being then held away from the disk by the pawl $n$ with which it engages (Fig. 3). The train of clockwork then begins to move, and the driving shaft $g$ transmits its movement of rotation to the eccentric disk $e$ and the cam $c^1$, which transmit to the operating stud $b$ its alternating rectilinear movement and its movement of advance and retreat. In consequence of this double movement, this stud engages successively in the various perforations $s^1$ of the disk $s$ and thus imparts to the latter a succession of movements of angular displacement. As a result of the inclination of the slide $a^2$ and of the guiding of the gudgeon $s^2$ of the disk $s$ in the slide $t^3$ of the sheath $t$, the various perforations $s^1$ arranged in a spiral, present themselves in succession to the action of the operating stud $b$ and the portions of the disk lying between these perforations are presented in succession in front of the aperture $a^1$ and therefore opposite to the lens of the camera. The different images of the kinematographic picture are thus photographed in succession spirally, as shown in Fig. 10 and only touch each other at one corner. At the same time as the photographic disk or plate is advanced, the shaft $d$ transmits the movement of rotation to the disk $o$ at reduced speed, so that, at the moment the displacement of the photographic disk $s$ before the aperture $a^1$ is to be arrested, this disk $o$ has completed a rotation. The stud $o^2$ thereupon raises the parol $n$ and thus releases the brake lever $m$ which, under the influence of its spring $m^2$ applies itself against the disk $k^2$ and arrests the movement. It is the pressure exerted by the clamping member $t^1$ of the sheath upon the disk which prevents the latter from falling when the operating stud leaves the same.

Figs. 11 to 19 represent an apparatus adapted for the reproduction of an animated picture by means of the disk exposed by the apparatus which has just been described. This apparatus comprises, as in the preceding case, a plate $a^0$ provided with a window $a^{10}$ and a slide $a^{20}$ in which moves a finger $b^0$ having a to and fro motion. This finger $b$ is mounted at the end of a rocking slide $b^5$ and can turn above a fixed axis $b^6$ in a plane at right angles to that of this slide; the said finger is maintained in a normal position to the plate $a$ by a stop $b^7$ and a flat spring $b^8$ secured on the slide $b^5$ and which rests against a branch $b^9$ of this finger $b$. In the direction of advance of the disk $s$ (Fig. 17), the finger $b$, engaged in one of the perforations provided in the disk and abutting against the stop $b^7$, actuates the disk by the movement it receives as indicated above. On the contrary, in the backward direction (Figs. 18, 19), the finger $b$, which can turn about its axis $b^6$, is disengaged from the disk $s$ by taking an inclined position and by bending the flat spring $b^8$; this finger returns to its initial position by sliding against the disk $s$, and as soon as it encounters the succeeding perforation, it engages therein by straightening itself under the influence of the flat spring $b^8$; then it communicates a new movement of angular displacement to the disk $s$, as it has just been said, and so on. The rocking slide $b^5$ movable about a fixed axis $b^{16}$ (Fig. 14) receives its to and fro motion from an eccentric $c^{10}$ keyed on a shaft $d^0$ provided with a worm $d^{40}$ gearing with a pinion $f^0$ mounted on a driving shaft $g^0$ having at its end a crank $g^3$ or actuated by any source of motive power. Moreover, the shaft $d^0$ carries a fly wheel shutter $d^{30}$. The plate $a^0$ is provided with a groove $a^{30}$ in which moves a gudgeon $w$ carrying the exposed plate or disk $s$, and the gudgeon $w$ is provided with a circular plate $w^1$ carrying a stud $w^2$ which enters in a hole in the disk or plate $s$ and so moves the latter with the gudgeon $w$ in the direction of rotation. This gudgeon $w$ can turn freely at the end of a lever $w^3$ movable about the axis $w^4$ and is integral with a pinion $w^5$ gearing with a toothed wheel $w^6$ carried by this lever $w^3$; this wheel $w^6$ is integral with a cam $w^7$ which abuts against a fixed projection $w^8$ under the influence of the coiled spring $w^9$ that draws back the lever $w^3$ (Fig. 15). By reason of the movement of angular displacement communicated to the impressed disk $s$ by the finger $b^0$, the gudgeon $w$, connected to the disk $s$, transmits a movement of rotation to the pinion $w^5$ and therefore to the toothed wheel $w^6$ and to the cam $w^7$, the latter abutting against the fixed projection $w^8$ causes the lever $w^3$ to move downward in the direction of the arrow shown in Fig. 15, this lever actuating by its movement the gudgeon $w$ and the disk $s$. The amplitude of the movement of angular displacement communicated to the lever $w^3$ is determined by that communicated to the disk $s$ by the finger $b^0$, in such a manner that the various perforations arranged in a spiral on this disk are presented in succession in front of the operating finger. When the last picture has passed, the edge of the cam moves away from the fixed projection $w^8$, and the lever drawn back by its spring returns the gudgeon to the top of its path and the disk presents anew its first picture in front of the window $a^{10}$. At the time of the releasing, the disk does not receive any rotary motion and presents at the end of its backward stroke, opposite the operating finger, the perforation corresponding to the first image. By means of this device the same scene can pass several times without any interruption. In front of the plate $a^0$ is mounted a spiral device 1 comprising reflection surfaces directing the rays of light and movable about an axis 2, in such a manner that the images can be seen either in the direction of the height or in the direction of the width. The pictures which thus pass in succession in front of the window $a^{10}$ can be seen directly or can be projected on a screen.

The system of advance which has just been described can also be applied to apparatuses for taking animated pictures on disks where the pictures are arranged circumferentially.

The picture taking apparatus shown Figs. 20 to 23, comprises a box $q$, carrying on its front face a lens $q^2$ and a winding crank $i$; inside this box is fixed the plate $a^{00}$ carrying all the operating mechanism and the clockwork which drives the same. This mechanism is combined in such a manner as to communicate to the operating finger a number of movements of angular displacement equal to the number of pictures which must be photographed on the disk. The winding crank $i^0$ is keyed on the driving shaft $g^{00}$ on which is fixed one of the ends of a spiral spring $g^2$ the other end of which is secured to a fixed pillar $h$. This driving shaft being rotated by the unwinding of the spring $g^2$, actuates the toothed wheel $f^{00}$ through the medium of a ratchet wheel $g^{100}$ keyed on this shaft $g^{00}$ and of a pawl $f^{100}$ carried by the wheel $f^{00}$. The latter gears with a pinion $d^{100}$ keyed on the shaft $d^{00}$ which transmits to the rocking slide $b^5$, a to and fro motion through the medium of the eccentric $c^{10}$. The shaft $d^{00}$ carries a rotary shutter $r^{00}$. On the latter is mounted the centrifugal governor which is constituted by two blocks $j$, movable about the axes $j^1$ fixed on this shutter and carrying each a friction shoe $j^2$ which presses, when the speed of the shaft $d^{00}$ attains a certain value, against a stationary crown $j^3$. When the finger $b^0$ has communicated to the disk to be impressed the number of movements of angular displacement corresponding to the number of pictures which must be photographed on this disk, the operating mechanism is stopped automatically by the following mechanism: The shaft $d^{00}$ carries a disk $k^2$ on which can act a brake lever $m$ movable about an axis $m^1$ and drawn back by a coiled spring $m^2$; this lever carries at its end a projection $m^3$ that engages, when the mechanism is at rest, in a notch $o^4$ provided on a disk $o^0$ keyed on the same shaft as a ratchet wheel $o^{10}$ controlled by a pawl $o^3$, mounted on the rocking slide $b^5$; the number of teeth of this ratchet wheel is equal to the number of pictures which must be photographed. When the projection $m^3$ is engaged in the notch $o^4$, the lever $m$ rests against the disk $k^2$ and all the mechanism is thus arrested. For starting the apparatus the push rod $p$ is acted upon. This rod forces back, through the medium of an auxiliary lever $p^1$, the brake lever $m$; the latter ceases then to press on the disk $k^2$ and the projection $m^3$ is disengaged from the notch $o^4$; all the mechanism is then put in motion by the action of the spring $g^2$. During the period of movement, the projection $m^3$ rests on the periphery of the disk $o^0$. When this disk $o^0$ has terminated its rotation, that is to say when the last picture has been photographed, the notch $o^4$ is presented in front of the projection $m^3$ and the lever $m$ drawn by its spring $m^2$, arrests again the operating mechanism. On this apparatus is used a sheath with blinds and in which are arranged the disks to be exposed. This sheath constructed so as to hold two disks comprises two compartments separated by a wall 3 and each of which is closed by a blind 4, 5. These two blinds are arranged in two series of grooves provided on the sides of the sheath, as seen in Fig. 25. The wall 3 carries on one of its faces a small fixed stud 6 on which is centered the disk to be exposed and intended to serve as an axis of rotation for this disk. Moreover, on each face of this wall 3 is mounted a spring plug 7 having for its purpose to press against the window $a^{100}$ of the photographic apparatus above described the portion of the disk which is to be exposed. Besides, this sheath is provided on its sides with any securing device allowing to mount it successively on its two faces on the photographic apparatus, so as to be able to expose successively the two disks held in this sheath. This type of sheath can also be applied to the system of photographic apparatus shown in Figs. 1 to 10, in this case the sheath will have a greater height than the disk to be impressed and each of the studs 6 will be movable in a slide carried by the wall 3, so as to permit the spiral movement imparted to the disk.

The clockwork driven operating device above described for the apparatus taking pictures arranged circumferentially, can also be used with an apparatus intended to reproduce animated pictures, as shown in Figs. 27 and 28. In this case, the plate $a^{000}$ carries a stud $a^4$ intended to serve as axis of rotation for the disk carrying the pictures and a spring clip $a^5$ pressing the disk against the window. In these views the means for bringing the finger into engagement with the perforations and for disengaging it from the latter is the same as that shown in Figs. 14, 16, 17, 18 and 19. This mechanism can be mounted inside the body of the apparatus which is of any suitable form. Fig. 29 shows the application of this mechanism on the back face of a photographic frame; this frame is provided at its upper part, on one of its sides, with an eye-piece 8 arranged in front of the window before which pass successively the pictures of the exposed disk.

More simple mechanisms, actuated by hand, can also be obtained, as shown in Figs. 30 and 31, the toothed wheel $f^{000}$ is then operated by a crank $z$. The finger in these views is also to be operated by means similar to that shown in Figs. 14, 16, 17, 18 and 19.

Claims:

1. In an apparatus for taking and reproducing animated pictures arranged according to a curve on a rotary disk, the combination of means including a pivot member adapted to support an image disk located in said supporting means, capable of rotating freely on said pivot and provided with perforations situated on the curve according to which the images are to be arranged, the interval comprised between these perforations corresponding to the width of said images, and means to cause movement of the disk to properly position the images in succession, said means including an operating pin intended to engage successively in the different perforations of the disk, and a mechanism communicating a to and fro motion to said operating pin.

2. In an apparatus for taking and reproducing animated pictures arranged according to a curve on a rotary disk, the combination of a removable sheath provided with a pivot adapted to support a sensitized disk located in said sheath, capable of rotating freely on the pivot of this sheath and provided with perforations situated on the curve according to which the images are to be arranged, the interval comprised between these perforations corresponding to the width of said images, and means to cause movement of the disk to properly position the images in succession, said means including an operating pin intended to engage successively in the different perforations of the disk, and a mechanism communicating a to and fro motion to said operating pin and applied to the chamber of the kinematographic apparatus.

3. An apparatus for taking and reproducing animated pictures arranged according to a curve on a rotary disk, characterized by the combination of a removable sheath provided with a pivot adapted to support a sensitized disk located in said sheath and provided with perforations situated on the curve according to which the images are to be arranged, the interval between these perforations corresponding to the width of said images, an operating pin intended to engage successively in the different perforations of the disk, a mechanism communicating a to and fro motion to said operating pin and applied to the chamber of the kinematographic apparatus, a window provided opposite the objective in the wall of said apparatus which is adjacent to the disk, and a spring clip carried by the sheath and intended to apply against said window the part of the disk which is presented opposite the latter for the purpose of maintaining the focusing and fixedness of the image.

4. An apparatus for taking and reproducing animated pictures arranged according to a curve on a rotary disk, characterized by the combination of a removable sheath provided with a pivot adapted to support a sensitized disk located in said sheath and provided with perforations distributed according to the curve on which the images are to be arranged, the interval between these perforations corresponding to the width of said images, an operating pin intended to engage successively in the different perforations of the disk, a mechanism communicating a to and fro motion to said operating pin and applied to the chamber of the kinematographic apparatus, a window provided opposite the objective in the wall of said apparatus which is adjacent to the disk, a spring clip carried by the sheath and intended to apply against said window the part of the disk which is presented opposite the latter, for the purpose of maintaining the focusing and the fixedness of the image, and projections for the register of the disk, mounted on leaf springs secured to the sheath, said projections engaging in holes suitably arranged in the sensitized disk.

5. In an apparatus for taking and reproducing animated pictures arranged according to a curve on a rotary disk, the combination of a changing magazine, removable sheaths provided with pivots adapted to support sensitized disks located in said sheaths and capable of rotating freely on the pivots of the latter, each of said disks being provided with perforations distributed according to the curve on which the images are to be arranged, the interval between these perforations being equal to the width of said images, and means to cause movement of the disk to properly position the images in succession, said means including an operating pin intended to engage successively in the different perforations of the disk which is presented to it, and a mechanism communicating a to and fro motion to said operating pin and applied to the chamber of the kinematographic apparatus.

The foregoing specification of my improvements in and relating to apparatus for taking or reproducing animated pictures signed by me this 22 day of June 1909.

LOUIS HENRI HUET.

Witnesses:
   H. C. COXE,
   R. EHIRIOT.